United States Patent [19]
Yablonski et al.

[11] Patent Number: 4,625,240
[45] Date of Patent: Nov. 25, 1986

[54] ADAPTIVE AUTOMATIC GAIN CONTROL

[75] Inventors: Robert E. Yablonski, Irvine; John A. Roe, Orange, both of Calif.

[73] Assignee: Eeco, Inc., Santa Ana, Calif.

[21] Appl. No.: 634,394

[22] Filed: Jul. 25, 1984

[51] Int. Cl.[4] .......................... H04N 7/04; H04N 5/52
[52] U.S. Cl. ..................................... 358/143; 358/174;
  358/198; 375/98; 381/104; 455/234
[58] Field of Search ............... 358/143, 174, 175, 176,
  358/179, 198; 455/234, 239, 240, 242, 245;
  375/98; 381/104, 106, 107, 108

[56] References Cited
U.S. PATENT DOCUMENTS

| 4,234,892 | 11/1980 | Mochizuki et al. | 358/174 |
| 4,429,332 | 1/1984 | Pargee, Jr. | 358/143 |
| 4,434,439 | 2/1984 | Steckler et al. | 358/176 |

Primary Examiner—James J. Groody
Assistant Examiner—Michael D. Parker
Attorney, Agent, or Firm—Knobbe, Martens, Olson & Bear

[57] ABSTRACT

A method and apparatus for optimally processing television compressed audio signals by adaptively controlling the gain of the apparatus. The average value of the digitized signal is compared to a reference value to produce a gain control signal. A variable input video signal amplitude is automatically accommodated to a fixed analog to digital converter range.

3 Claims, 1 Drawing Figure

ADAPTIVE AUTOMATIC GAIN CONTROL

TECHNICAL FIELD

This invention pertains to the recovery of audio information from television compressed audio signals. Adaptive automatic gain control is used to optimally apply the video signal to an analog to digital converter (ADC).

The full dynamic range of the ADC is thus utilized, preserving the signal to quantizing noise ratio and avoiding overscale clipping as well.

BACKGROUND ART

U.S. Pat. No. 4,429,332, issued Jan. 31, 1984 to Robert Pargee, Jr., entitled "Television Compressed Audio", discloses the essential method and means for impressing sound upon a video waveform. A reverse process recovers the original sound signal. Unless gain adjustment is provided at the playback of the video signal, variations in equipment and recording media may result in a signal amplitude that is larger or smaller than the full scale capability of the ADC device. A signal of less amplitude than full scale reduces the signal to quantizing-noise ratio. A signal of greater amplitude than full scale causes overscale and hard limiting of the ADC, with subsequent clipping of the audio output amplitude.

SUMMARY OF THE INVENTION

Sound information encoded into video frequencies in a standard television format is applied to a variable gain amplifier. The blanking level extracted from the waveform is used to establish the correct D.C. level. The sync amplitude is used to initially set the variable gain amplifier to produce output video with a fixed sync amplitude. Additional adaptive gain control is applied through a digital to analog converter (DAC). The DAC output correction factor is derived from the average value of the processed video signal. TV compressed audio waveforms differ from conventional video waveforms in that compressed audio predictably averages exactly to a gray level half-way between white and black. This characteristic provides opportunity for gain control not possible with ordinary video waveforms. This additional gain control makes it possible to adaptively set the full scale video waveform accurately, even if sync is selectively compressed or expanded. Various non-linearities at different stages of normal video processing for recording or transmission typically selectively compress or expand sync amplitude in relation to that of the video signal. The adaptive automatic gain control of this invention overcomes these signal processing non-linearities to set the video signal amplitude to a fixed value for subsequent analog to digital conversion. If the video signal amplitude was not set to a fixed level, effective use of the full dynamic range of the ADC is not obtained. This would result in either clipping the peaks of the video waveform or in reduced signal to quantizing noise ratio. The adaptive automatic gain control avoids these signal degradations.

BRIEF DESCRIPTION OF THE DRAWINGS

In FIG. 1 a television compressed audio signal from a source not shown enters the system at arrow (conductor) 1. This signal enters variable gain and offset amplifier 2, which may be a type CA3280E device. At conductor 3 the output therefrom enters analog to digital converter 4, which may be a type TML 1070 device. The digital output from the ADC passes through buffer & control circuits 5 to random access memory (RAM) 6.

Figure 1:
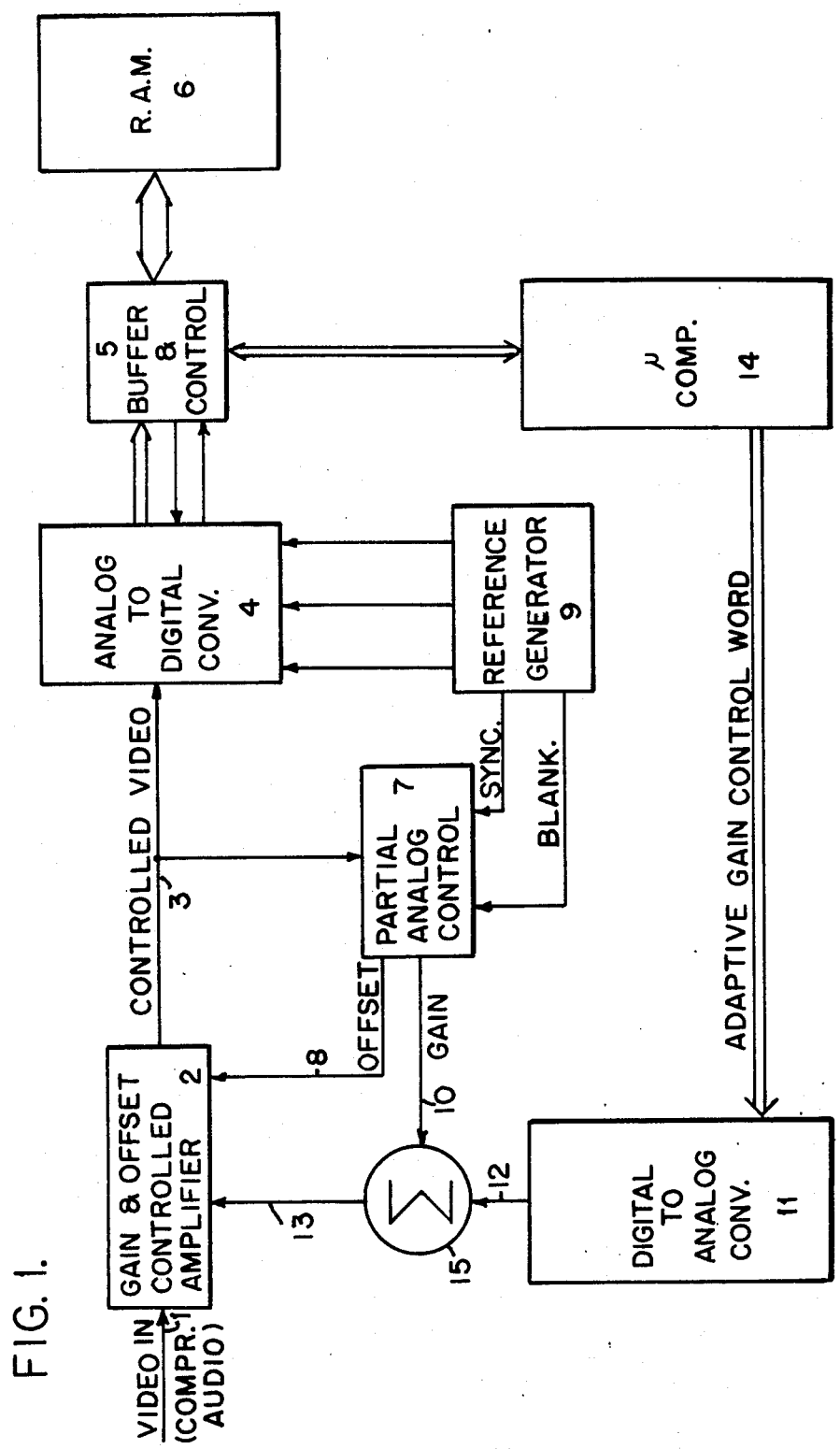
FIG. 1 is a block diagram of the apparatus.

The signal at conductor 3 also enters partial analog control 7, which utilizes known techniques to extract blanking level and sync amplitude information. The blanking level of video signal 3 is brought to zero amplitude in a conventional manner by offset control signal 8. Reference generator 9 provides D.C. reference voltages to ADC 4 and partial analog control 7. The blanking reference is zero volts. The plus and minus full scale voltage reference to the ADC and the sync amplitude voltage reference are derived from a common voltage reference, which may be a type MC1403 device.

Partial analog control circuit 7 produces gain control signal 10 by conventional techniques, which bring sync amplitude at conductor 3 to equal sync reference.

The output signal at 12 from DAC 11, summed with the signal from partial analog gain control 10, produces control signal 13, which is applied to variable gain amplifier 2. Circuit scaling is such that when the DAC is at mid-range, partial analog control makes the sync amplitude in signal 3 equal to sync reference.

Full scale DAC output is scaled to have the effect such that sync amplitude at conductor 3 is less than sync reference, such as 80 percent of sync reference. Zero scale output of the DAC has the effect such that sync amplitude in in signal 3 is greater than sync reference. Typically, this may be 120% of sync reference. The DAC output has the capability of adjusting the action of gain control loop 2 - 3 - 7 to control sync amplitude over a range of, say, from 80% to 120% of sync reference. Initially the DAC is set to produce sync that has an amplitude equal to the amplitude of sync reference.

Circuit scaling is also set so that full scale video at white level is equal to full scale of acceptance on ADC 4. Blanking level video is equal to zero scale on ADC 4. The combination of controlled amplifier gain and offset with ADC range from zero to full scale comprises the scale factors applied to the compressed audio signals. Normal video full scale to sync amplitude ratio is 2.5 (300 millivolts sync and 750 mv white level initial setting of the gain control using sync amplitude assumes the normal ratio of 2.5).

ADC 4 converts the analog television format audio signal at 3 and stores the digital samples thereof in memory 6. Subsequently, microprocessor 14 calculates the average value of all of the samples stored in memory 6. If this value is exactly mid-scale (gray) the adaptive automatic gain control algorithm results in a DAC output of mid-scale and this does not change the gain. If the average of all samples is less than mid-scale, the DAC output is decreased proportionately. This causes the gain control loop to provide sync of greater amplitude than sync reference and also to increase the amplitude of video applied to the ADC. The second conversion with increased gain will have an average value of samples closer to exactly mid-scale. Subsequent conversions will converge to average equal mid-scale.

Similarly, if the first average is greater than mid-scale the control algorithm increases the DAC output. This causes the gain control loop to reduce gain until sync amplitude is less than sync reference. The second conversion with reduced gain will average closer to the mid-scale value. Again, the subsequent conversions converge to mid-scale.

The overall action of the adaptive automatic gain control is to automatically compensate for variations of the video input signal amplitude. Full scale of the ADC is correctly matched by full scale of the video signal, even when sync has been compressed or expanded by video processing units.

We claim:

1. The process of controlling a television compressed audio signal that comprises the processing steps of;
   (a) applying said compressed audio signal to a gain and offset controlled amplifier,
   (b) applying the output of said gain and offset controlled amplifier to an analog to digital converter,
   (c) storing the thus converted signal in digital form,
   (d) determining the average value of the stored signal,
   (e) generating a control word according to the average value of the stored signal,
   (f) applying the control word to a digital to analog converter, and
   (g) applying the output of said digital to analog converter to said controlled amplifier to contol the gain thereof.

2. An adaptive automatic gain control apparatus comprising;
   (a) a gain and offset controlled amplifier (2) to accept a video signal, and also a compressed audio signal (1) for scaling,
   (b) an analog to digital converter (4) connected to receive a controlled video signal from said controlled amplifier (2), and to output digital converted compressed audio signal samples,
   (c) a random access memory (6) to store the digital converted compressed audio signal samples,
   (d) a computer (14) connected to said memory to calculate the average value of all of the digital converted compressed audio signal samples stored in said random access memory (6), and
   (e) a digital to analog converter (11) connected to said computer and to said controlled amplifier to adjust the gain of said controlled amplifier.

3. An adaptive automatic gain control apparatus comprising;
   (a) a gain and offset controlled amplifier (2) to accept the video input signal (1) to be controlled,
   (b) a reference voltage generator (9),
   (c) a partial analog control entity (7) connected to said generator (9), for receiving sync and blanking reference information therefrom,
   (d) means to impress an offset control voltage (8) upon said controlled amplifier (2) from said control entity (7),
   (e) means to impress a gain control voltage (10) upon said controlled amplifier (2) from said control entity (7),
   (f) an analog to digital converter (4) connected to receive controlled video from said controlled amplifier (2),
   (g) a buffer and control entity (5),
   (h) a random access memory (RAM) (6) connected to said analog to digital converter (4) through said buffer and control entity (5),
   (i) a digital to analog converter (11),
   (j) a microcomputer (14) connected to said buffer and control entity (5), and to said digital to analog converter (11), for providing an adaptive gain control word to said digital to analog converter (11),
   (k) a summing junction (15) connected to pass said gain control voltage (10) from said control entity (7), and also a gain control voltage (12) from said digital to analog converter (11), and
   (l) a connection (13) from said summing junction (15) to said controlled amplifier (2), to implement adaptive automatic gain control of said controlled amplifier.

* * * * *